UNITED STATES PATENT OFFICE.

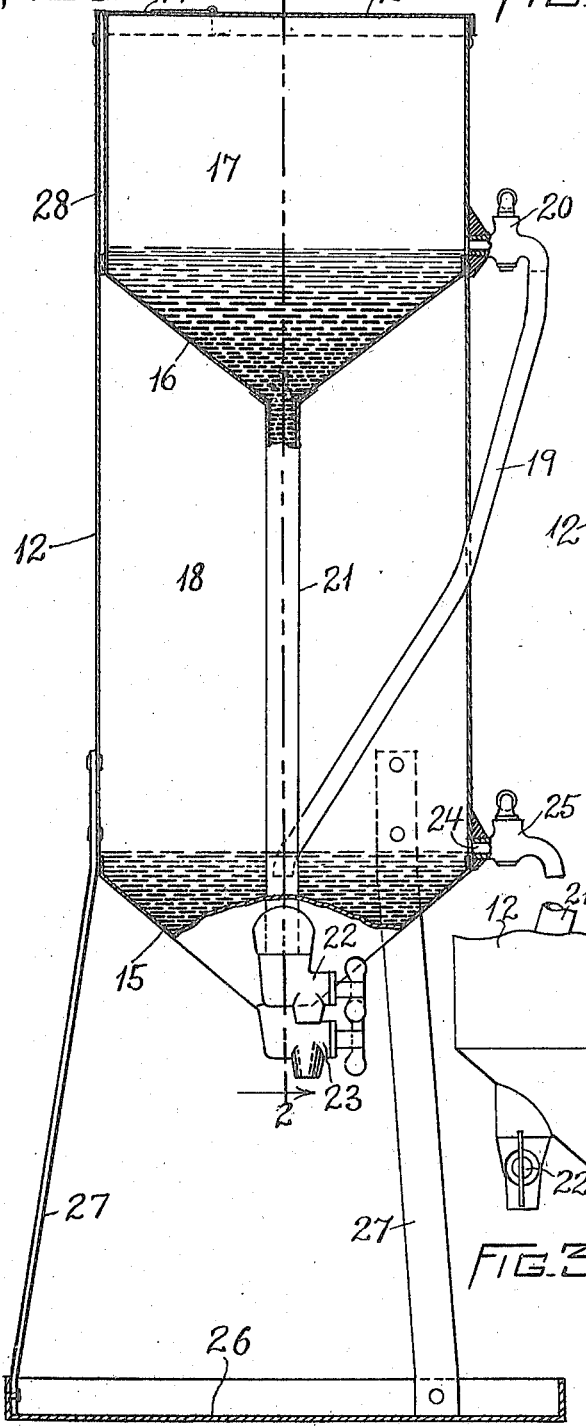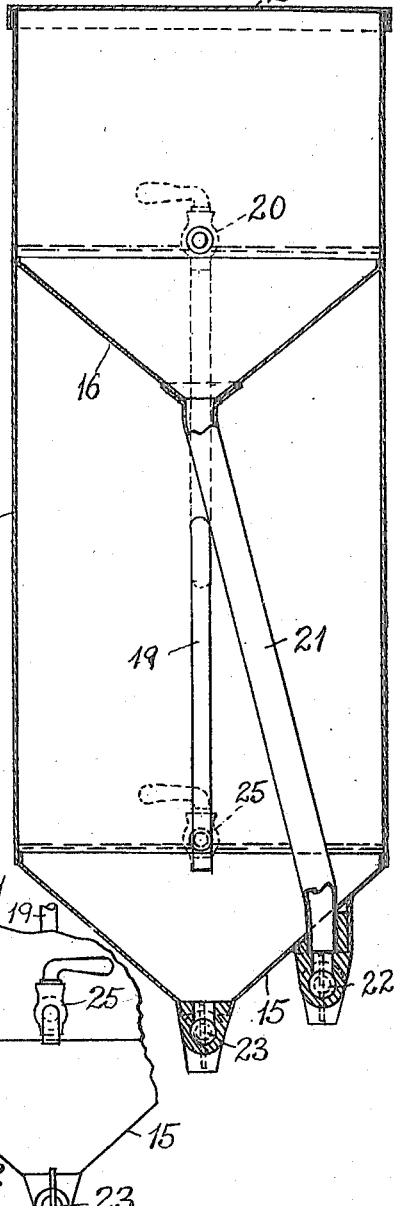

WILLIAM A. SEXTON, OF NEWTON, MASSACHUSETTS.

OIL CLARIFYING AND DISPENSING APPARATUS.

1,248,730. Specification of Letters Patent. Patented Dec. 4, 1917.

Application filed June 13, 1917. Serial No. 174,490.

*To all whom it may concern:*

Be it known that I, WILLIAM A. SEXTON, a citizen of the United States, residing at Newton, in the county of Middlesex and State of Massachusetts, have invented new and useful Improvements in Oil Clarifying and Dispensing Apparatus, of which the following is a specification.

This invention has for its object to provide a simple and effective apparatus for clarifying and dispensing lubricating and other oils, containing a considerable percentage of foreign matter, the oil being for example, lubricating oil that has been used in lubricating engines and other mechanism, and has become more or less contaminated with carbon and other foreign matter.

The invention is embodied in an apparatus comprising a primary and a secondary settling tank, one located above the other, each having a sediment collecting dished bottom, and an oil outlet above said bottom, the oil outlet of the lower or secondary tank being provided with dispensing means, and the oil outlet of the upper or primary tank including a conduit communicating with the primary tank above its bottom and extending downwardly to the lower portion of the secondary tank, the arrangement being such that contaminated oil poured into the primary tank is partially clarified by the settling of foreign matter therein in said tank, the partially clarified oil overflowing into the secondary tank and being dispensed therefrom, the sediment remaining in the oil entering the secondary tank being deposited in the dished bottom of the latter, means being also provided for discharging accumulations of sediment from the lowest portion of the dished bottom of said tanks by gravity.

Of the accompanying drawings forming a part of this specification,—

Figure 1 is an elevation of an apparatus embodying the invention, a part being shown in section.

Fig. 2 is a section on line 2—2 of Fig. 1.

Fig. 3 is a fragmentary side elevation, showing a portion of the secondary tank.

The same reference characters indicate the same parts in all of the figures.

In the preferred embodiment of my invention represented by the drawings, 12 represents a vertical elongated hollow body, preferably of cylindrical form and of sheet metal, adapted to receive oil at its upper end, said end being preferably closed by a cover 13 having an opening and a hinged flap 14, normally closing said opening. The lower end of the body 12 is provided with a dished bottom 15, preferably frusto-conical, and adapted to collect sediment. 16 represents a partition subdividing the interior of the body into an upper or primary settling tank 17 and a lower or secondary settling tank 18, the partition 16 being dished and preferably frusto-conical and constituting the sediment collecting bottom of the primary tank. I use the word "dished" to convey the idea that each bottom has a form equivalent to that of an inverted cone frustum, the apex of which is the lowest portion of the bottom. Each bottom is therefore adapted to collect sediment and discharge the same at its lowest portion, the sediment accumulating on each dished bottom being guided thereby into the accompanying sediment conduit.

An oil conduit communicates with the primary tank above its sediment collecting bottom and includes a conduit 19 adapted to discharge partly clarified oil into the lower portion of the secondary tank, said conduit being a tube extending through one side of the body 12, as shown by Fig. 1. The conduit or oil outlet 19 is provided with a valve at 20, said valve as here shown being formed by a suitable casing and an apertured plug adapted to turn therein.

The dished bottom 16 of the primary tank is provided with a sediment outlet, which is preferably an elongated conduit 21, communicating with the lowest portion of said dished bottom and extending downwardly therefrom to and through the bottom 15 of the secondary tank, as shown by Fig. 2, said conduit being provided with a valved outlet 22.

The dished bottom 15 of the secondary tank communicating with the lowest portion of said bottom and extending downwardly therefrom, is provided with a valved sediment outlet 23.

The secondary tank is provided with a clear oil outlet 24 located above its bottom and provided with valved oil-dispensing means, preferably embodied in a faucet 25 of ordinary construction.

The structure above described is preferably supported at a suitable height to permit receptacles to be placed under the several outlets, the supporting means here shown being embodied in a pan-shaped base 26 and legs or standards 27 connecting said base with the body 12.

The secondary tank is provided with a vent 28 which, as shown by Fig. 1, is a tube extending from the upper portion of the secondary tank to and through the cover of the primary tank, the vent permitting the escape of air displaced by oil entering the secondary tank.

The various outlets being closed and oil containing foreign matter poured into the primary tank, the foreign matter therein settles in the dished bottom 16 and in the sediment conduit 21. The partly clarified oil accumulates in the vicinity of the receiving end of the outlet 19. When the valve 20 is opened, the partially clarified oil flows through the outlet 19 into the secondary tank. The sediment still remaining in the oil settles in the dished bottom of the secondary tank, and the completely clarified oil accumulates in the vicinity of the dispensing outlet 24 and is dispensed thereat. The sediment outlets 22, 23 may be opened from time to time to discharge the accumulations of sediment.

The substantially vertical arrangement of the sediment conduits enables the sediment to be effectively discharged by gravity, the sediment being guided to said conduits by the dished bottoms.

It will now be seen that oil containing foreign matter is clarified by successive settlings of the foreign matter in the primary and secondary tanks, and that the oil partially clarified in the primary tank accumulates above the sediment in the bottom thereof and is discharged into the secondary tank where its clarification is completed.

I prefer to extend the conduit 19 forming the partially clarified oil outlet so that its delivering end is below the clarified oil outlet 24 of the secondary tank. The partially clarified oil is therefore conducted through and below an accumulation of clarified oil in the secondary tank, as clearly shown by Figs. 1 and 2, so that the clarified oil accumulated in the vicinity of the outlet 24 is kept separate from the partially clarified oil discharged by the conduit 19.

The lower end of the outlet 19 is below the level of the clear oil outlet 24, and below the surface of an accumulation of clarified oil in the secondary tank. The object of this arrangement is to prevent any part of the accumulation of clarified oil from being agitated and forced downwardly into the sediment below it, by the partially clarified oil delivered by the outlet 19. The clarified oil is therefore maintained in an undisturbed condition for decantation through the outlet 24. The sediment conduits 21 and 23 extend side by side through the bottom of the secondary tank and are in close proximity to each other, so that they are adapted to discharge sediment into a receptacle common to both conduits.

The conduit 19 constitutes a decanting outlet for partially clarified oil, communicating with the primary tank above the sediment-collecting portion thereof and extending into the secondary tank, and the outlet 24 constitutes a decanting and dispensing outlet communicating with the secondary tank above the sediment-collecting portion thereof.

I claim:

1. An oil clarifying and dispensing apparatus comprising a secondary settling tank having a dished sediment-guiding bottom, a substantially vertical valved sediment conduit communicating with and extending downwardly from the lowest portion of said bottom, and a valved outlet for clarified oil located above said bottom, and a primary settling tank located above the secondary tank and having a dished sediment-guiding bottom, a substantially vertical valved sediment conduit communicating with and extending downwardly from the lowest portion of said bottom, and an outlet for partly clarified oil communicating with the primary tank above the bottom of the latter and including a conduit arranged to deliver partly clarified oil to the secondary tank, said conduit extending below the clarified oil outlet of the secondary tank and being adapted to conduct partially clarified oil through an accumulation of clarified oil in the secondary tank, without agitation of said accumulation.

2. An oil-purifying apparatus comprising a primary settling tank and a secondary settling tank, each tank having a dished sediment-collecting and guiding bottom, an oil outlet communicating with the tank above said bottom, and a substantially vertical valved sediment conduit communicating with and extending downwardly from the lowest portion of said bottom, the sediment conduit of the primary tank extending through the bottom of the secondary tank, said conduits permitting independent gravity discharges of sediment from the tanks into a common receptacle, the oil outlet of the primary tank including a conduit extending into the lower portion of the secondary tank, the construction and arrangement being such that oil introduced into the primary tank is partially clarified therein, and transferred to the secondary tank in which it is additionally clarified and from which it is dispensed, the sediment collected on said bottoms being guided thereby to and through the sediment conduits and discharged therefrom by gravity.

3. An oil-clarifying and dispensing apparatus comprising a primary and a secondary tank, arranged one above the other, each having a dished sediment-collecting bottom, sediment conduits extending downwardly from the lowest portions of said bottoms and each adapted to receive sediment by gravity from all portions of the accompanying bottom, and to discharge the sediment by gravity, a decanting outlet for partially clarified oil, communicating with the primary tank above the sediment-collecting portion thereof, and extending into the secondary tank, and a decanting and dispensing outlet communicating with the secondary tank above the sediment-collecting portion thereof.

In testimony whereof I have affixed my signature.

WILLIAM A. SEXTON.